Aug. 30, 1966 T. OSWALD 3,270,147
REPEATERED TELEPHONE SYSTEMS
Filed March 10, 1966 3 Sheets-Sheet 1

INVENTOR
THOMAS OSWALD
BY Cushman, Darby & Cushman
ATTORNEYS

INVENTOR
THOMAS OSWALD
BY Cushman, Darby & Cushman
ATTORNEYS

INVENTOR
THOMAS OSWALD
BY Cushman, Darby & Cushman
ATTORNEYS

United States Patent Office 3,270,147

Patented August 30, 1966

3,270,147

REPEATERED TELEPHONE SYSTEMS

Thomas Oswald, Longfield, Dartford, Kent, England, assignor to Submarine Cables Limited, London, England, a corporation of the United Kingdom Filed Mar. 10, 1966, Ser. No. 533,200
Claims priority, application Great Britain, Oct. 6, 1961, 36,093/61
8 Claims. (Cl. 179—170)

This application is a continuation-in-part of application Serial No. 227,866, filed October 2, 1962.

This invention relates to repeatered communication systems such as submarine telephone cable systems equipped with submerged repeaters; it is not, however, limited to submarine cable systems but may also be usefully applied to other systems whose repeaters are not readily accessible for adjustment and maintenance.

An object of the invention is to reduce the harmful effect of time-dependent deviations of the average of the repeater section losses from the value assumed in the system design, particularly the resulting increase in the resistance noise. This object is accomplished without decreasing the overload margin of the system, i.e. the number of decibels by which the signal level may be raised above the designed operating level, before overload occurs. Alternatively, of course, the overload margin could be increased as compared with prior art, if this is preferred to a reduction in resistance noise; this of course requires a change in the designed operating level. In principle, the invention could also be applied to reduce the similar harmful effects of deviations in the average of the repeater gains, but it so happens that in modern repeaters such deviations are relatively small, thanks to the use of large amounts of negative feedback, and, as explained in U.S. specification 2,342,544, they tend to disappear towards the upper end of the frequency spectrum, where the problem of obtaining a satisfactory signal-to-noise ratio is most acute.

The invention is applicable, for example, to two well-known types of submarine telephone cable systems, namely those in which separate unidirectional cables provide two oppositely-directed transmission paths, and those in which a single cable provides transmission in both directions on a frequency-separation basis. A complete description of a typical system of each type may be found in the Post Office Electrical Engineers' Journal, volume 49, January 1957, pages 284 to 399, which also mentions a short land cable equipped with submarine-type repeaters; a similar but longer land cable of this kind would be typical of a non-submarine system to which the invention would be applicable.

Submarine cables often exhibit changes of attenuation with time. In particular, a substantial change in the overall attenuation of a cable, to the extent of several decibles, is liable to occur when a cable is laid in comparitively shallow water or in other situations which are subject to temperature variations.

In addition, the attenuation of the cable may change slightly during the first few years after laying. The cause of this phenomenon is not yet known, but it may account for a reduction in attenuation of the order of ½%.

When it becomes necessary to repair a submarine cable, it is necessary to insert an additional length of cable, whereby the overall length is increased; generally by an amount corresponding to twice the depth of water at the position of each such repair. Moreover, such repairs may be distributed at random along the length of the cable, in the course of time.

There are also other circumstances in which there will be a difference between the average repeater gain and the average attenuation of a repeater section of cable; for example an error might occur in estimating the attenuation change which occurs when the cable is laid. As far as possible, such errors are compensated during the laying of the cable by making adjustments in the overall length of each "ocean block," i.e. each assembly of five to ten repeaters with their associated repeater sections of cable; the length of the first repeater section of each ocean block being adjusted as necessary, just before it has to be spliced to the preceding ocean block to permit continuous laying of cable. The process is described in detail in the series of articles already cited, namely P.O.E.E.J., 49, 323. However, such a process must necessarily be conducted somewhat hurriedly and on the basis of extrapolated data; if, in addition, some hours should elapse before the laying effect becomes complete, the compensation may only be an approximation.

It would obviously be desirable that there should be no cumulative difference between the repeater section attenuations and the repeater gains, so that the input and output levels at each repeater would be uniform throughout the length of the cable. If there is a cumulative or systematic difference so that the levels are non-uniform, this will lead to a reduction in the maximum power which can be transmitted over the system without overloading at least some of the repeaters. It will also lead to an increase in the total amount of resistance noise, as compared with an ideal system having the same means input level at every repeater; low level repeaters generate more noise than in an ideal system but although high level repeaters generate less noise, there is a net increase of noise for the whole system. However, such cumulative differences are certain to occur, and must be considered.

According to prior art, the harmful effects of such cumulative differences are normally reduced in two ways.

In the first place, that attenuation of a repeater section about which equal positive and negative deviations may occur (i.e. the median attenuation) is made equal to the median gain of the associated repeater about which equal positive and negative deviations may also occur. This can be done, in part, by suitably dimensioning the lengths of repeater sections when the repeaters are spliced into the cable in the factory to form ocean blocks, and to a lesser extent by final adjustment of the length of the first repeater section of each ocean block, on the cable ship immediately before it is laid; alternatively, the gain characteristic of each repeater may be suitably adjusted, during manufacture. Thus, for example, referring to P.O.E.E.J., 49, 384, first paragraph, it is stated that "the repeater spacing is such that when both land and submarine cable sections are at mean temperature, the compensation is as accurate as possible." (This remark relates to the Clarenville-Terrenceville-Sidney Mines cable, in which the land and sea sections are treated as separate "submarine" cables.) Reference is also made to P.O.E.E.J., 49, 338, where it is stated that "Partial compensation for laying effect was carried out at the cable factory by slightly lengthening the individual repeater sections. The "laying effect" referred to in this quotation probably included the beginning of the ageing effect already mentioned above. A further example occurs in U.S. specification 2,342,544 in which FIGURE 3 shows that the repeater gain characteristics labelled "initial A" and "ultimate A" deviate equally and in opposite directions from the loss C of a repeater section of cable.

The second way in which the harmful effects of cumulative differences between repeater section attenuation and repeater gain are reduced according to prior art, consists in compensating for the change in overal loss or gain of the transmission path, by introducing corresponding changes, each of half the amount and of the opposite sign to the change in the transmission path, in the terminal stations at the ends of the cable. This procedure has the effect of maintaining a constant level in the middle of the transmission path, with equal and opposite deviations in level at the two ends. Thus in P.O.E.E.J. 49, 339 it is stated that "Temperature equilizers are used both in the transmitting and receiving terminals to minimize the signal/noise degradation caused by temperature misalignment." The temperature equalizers mentioned here are, in fact, artificial cables or cable simulators, having an attenuation-frequency characteristic similar to that of the cumulative difference between loss and gain which it is desired to correct. In P.O.E.E.J., 49, 384, FIGURE 10, it is seen that the level at the mid-points of both routes is also held constant in spite of temperature variations, by suitable adjustment of cable simulators at all three stations. (The principle is applied in this case to the submarine and land cable sections separately.) Finally, in U.S. specification 2,342,544, FIGURE 4, it is seen that the initial and ultimate transmission levels at 25 kc./s. are identical in the middle of the route (output of R3 and input of R4) and deviate symmetrically from each other at other points along the route. The text states, "In practice the levels would be changed at both ends to such values as to secure best signal transmission with minimum interference."

It would seem that, apart from these two well-known procedures, nothing further could be done to reduce the effects of cumulative differences between repeater gain and repeater section loss, and that the introduction of deliberate misalignment would be disadvantageous, but surprisingly this is not the case. In fact it will be shown that there is an advantage in departing somewhat from the first of the above procedures, in the sense specified below.

According to this invention, a repeatered cable system comprises a line transmission path having, in the direction of transmission, a first and a second half, the path having a certain median overall gain or loss, the maximum expected systematic time variation about the said median value being ±2Y nepers and being substantially proportional to the square root of the frequency of operation; two terminal stations connected to respective ends of the said path; and a plurality of repeaters, and of repeater sections interposed therebetween, disposed along each half of the path, there being a total of N repeaters in the two halves of the path, each repeater having a certain median gain and each repeater section having a certain median loss, the median values of the gains of the repeaters of the first half of the path being systematically set and the lengths of the interposed repeater sections being systematically dimensioned so that the average of the median gains of the repeaters of the said first half exceds by $2Y/N$ nepers the average of the median losses of the repeater sections in that half, the respective said parameters of the repeaters and of the repeater sections of the second half of the path being so systematically dimensioned that the average of the median gains of the repeaters of the said second half is less by $2Y/N$ nepers than the average of the median losses of that half; the relative input levels of repeaters in the middle region of the line path being maintained in use substantially constant, despite the aforesaid variations, by adjustments made in known manner at the terminal stations.

When such a system is in operation, the input levels of the repeaters at or near the mid-point of the line path are at all times at least as high as the input level of a repeater in any other part of the line path; it being understood that individual random or accidental variations are to be disregarded. The resistance noise, or valve noise, of such a system is substantially less than that of a system in which there are no deliberate systematic differences between the repeater gains and the repeater section losses, of each half of the system.

In the application of the invention to a unidirectional cable, the said difference of $2Y/N$ nepers between repeater gain and repeater section loss is preferably obtained by choosing a shorter average repeater section length from the input terminal of the line path to the mid-point and a longer average repeater section length from the mid-point to the output terminal of the line path.

In the application of the invention to a bidirectional system, the average repeater section length is preferably maintained constant throughout both halves of the line path but the repeater gain-frequency characteristics are so arranged that, in each frequency band, the average of the median repeater gains exceeds the average of the median repeater section losses by $2Y/N$ nepers from the first repeater, at the input terminal for that band, to the mid-point, and is less than the average of the median repeater section losses by $2Y/N$ nepers from the mid-point to the last repeater, at the output terminal for that band; the differences being thus those which would be observed at a time when the overall loss or gain variation is zero.

The said repeater gain-frequency characteristics may be adjusted by the aforesaid amount of $2Y/N$ nepers, by inserting an artificial cable element or network, whose loss is $4Y/N$ nepers, in one or other of the two transmission paths of each repeater, according to its position in the system, and by making the average repeater section loss $2Y/N$ nepers less than the average repeater gain would be, were the artificial cable not present. The location of the artificial cable is explained more precisely in explaining FIGURE 5 hereinafter. An equivalent result may alternatively be obtained by introducing dissipative elements in the filters, by appropriate selection of the characteristics of the equalizers, or by any other circuit changes which have the same effect as the introduction of the said artificial cable, as described, even if no structural difference is involved.

It is also within the scope of the invention to treat a bidirectional system as a unidirectional one, when it is only required to reduce the noise in one frequency band, and when the noise in the other frequency band may be allowed to increase.

To apply the invention to a given system it is necessary to calculate in advance, at least approximately, the value of ±2Y, the amount by which the overall loss or gain of the transmission path varies with time. This is a difficult task, but one which may be accomplished by a manufacturer with considerable experience. Indeed, this calculation must be done even if the present invention is not to be applied, so that the customer may feel confident that the overall performance of the complete system will be satisfactory. In fact, only manufacturers with adequate experience are normally invited to tender for such systems. It is also necessary to estimate the amount and sign of the variation in overall loss or gain which will occur immediately after the cable is laid, in order to make suitable corrections to the ocean blocks; the conditions, specified hereinbefore, apply to the system at a time when the overall variation of loss or gain is zero. This task also is necessary in any case, and the information has always been used during the process of adjusting the ocean blocks while the cable is being laid. However, it is relatively easy to make this estimate since the precise condition of cable and repeaters is known, there are no repairs, and the sea bottom temperature can be determined accurately during the laying operation.

It is also less difficult at present to make the above calculations, because several repeatered telephone cables have already been laid over most important routes and thus provide valuable data on sea bottom temperature variations, the ageing of cable made by different factories, errors liable to be encountered during laying and other factors involved. In particular, variations in the loss or gain of the transmission path (as distinct from those of the complete system as between exchanges) are continuously recorded for most existing cables, and may be assigned to various causes on the basis of the time pattern or information obtained on other cables.

From time to time, data obtained from submarine cable systems, bearing on the above points, has been published; for example in P.O.E.E.J. 49, 337–339, 344–345, and 380–384. The following additional notes may be helpful.

*Ambient temperature variations*

These are mostly encountered in cables laid in shallow water. However, because such waters are often also fishing grounds, the sea bottom temperatures may have been investigated by fishery research institutions. Available information on deep-sea temperature variations is more limited, but deep-water circulation is the subject of much oceanographic research, particularly since the Swallow float has become available as a research tool. Naval authorities are also interested in sea temperature, as it affects the performance of submarines. Although such naval information is unlikely to be published, it might be made available for specific purposes on a confidential basis.

Most submarine cables with copper conductors and polyethylene insulation have a temperature coefficient of attenuation of about 0.16% per degree centigrade. Temperature variations in the sea may possibly reach $\pm 10°$ C. or may be negligible. The variation with time may have any of a number of possible patterns, e.g. weather-dependent, tidal, diurnal, annual, multi-annual, secular, catastrophic and possibly others. The mechanism of variation may be just the influence of the weather on coastal waters, or there may be internal waves at the interface between different bodies of water. These waves, which are large and slow, may resonate mechanically with solar or lunar tides once or twice per day, causing temperature variations, at certain depths, of $\pm 2\frac{1}{2}°$ C. Overfalls of cold water over submarine thresholds or from convergences in arctic or antarctic surface waters may start and stop for reasons which are not always clear. (See for example "Exploring the Secrets of the Sea," William J. Cromie, published by Allen and Unwin, pages 86 and 96.) The carbon dioxide content of the atmosphere is increasing, and this may lead to complicated patterns of secular change. There are also rhythms lasting an integral number of years, a matter first discussed by E. le Danois, "L'Atlantique, Histoire et Vie d'un Océan," Editions Albin Michel, although his explanations are not generally accepted. The temperature variation of a particular route is thus an ad hoc study, mostly aided by observations on existing nearby cables. General rules are not very helpful.

*Ageing of a cable*

Some progress has been made in reducing the ageing effect of submarine cables, and it is no longer as serious as it was at the time of the first transatlantic telephone cables. In this case the nature of the manufacturing techniques is all-important, and it is the duty of every cable manufactures to establish by trials at sea and by analysis of tests on cables previously laid, the amount of ageing on his own cable. A reduction of ½% in attenuation has been observed in the past.

*Repairs of laid cables*

Submarine telegraph cables have been in operation for more than 100 years, in all parts of the world. All cable manufacturers and operating companies are now able to assess, with considerable accuracy, how many repairs are to be expected in any given area. Here again, general rules are not very helpful. However, if the number of repairs in a given locality becomes excessive, for some unforeseen reason, it is possible to remedy the situation at least partly, by renewing a short length of cable in which there are several adjacent repairs, or by using repair cable of larger diameter and lower attenuation. Although the number of repairs in shallow water is certainly greater than the number in deep water, the amount of extra cable inserted in a shallow water repair is rather small, so that the somewhat arbitrary assumption that repairs are uniformly distributed along the route is not unreasonable.

The number of repeater repairs is a matter on which most customers require an estimate from the manufacturer on the basis of his past experience, supported by guarantees.

*Other sources of variation*

Other kinds of loss or gain variations are relatively unimportant. The deviations arising from manufacturing tolerances are generally known before the repeaters and cable sections are assembled to form ocean blocks. The accuracy of the adjustment of each ocean block, during laying, depends on a rather complex procedure in which there is a considerable element of skill. In any case a given manufacturer should be able to estimate such variations on the basis of his past experience. Such estimates are usually demanded by the customer.

It will generally be found that the quantity of $2Y/N$ nepers will lie in the range 0.001 to 0.1 neper, or approximately 0.01 to 1.0 db, and Y in the range 0.1–1.0 neper or 1–10 db. Apart from the presence of a small network in the case of a bidirectional repeater, it may be quite difficult to observe the difference between an individual repeater section of cable or an individual repeater which incorporates the invention and one which does not, but the effect on a plurality of sequentially connected repeater sections and repeaters would be readily observable, and could be demonstrated by loop gain tests or other measurements on the complete system. It will be remembered that the transmission level is the cumulative algebraic sum of gains and losses from some datum point up to a given point in the system, so that any systematic difference between gain and repeater section loss becomes apparent on the complete system. The same remark is applicable to the repeater described in U.S. specification 2,342,544.

The application of the invention to submarine cable systems will now be described with reference to the accompanying drawings in which:

FIGURES 1 to 4 diagrammatically represent the effect of misalignment in a cable system under various conditions;

FIGURE 5 diagrammatically illustrates the circuit of a repeater;

Figure 7:
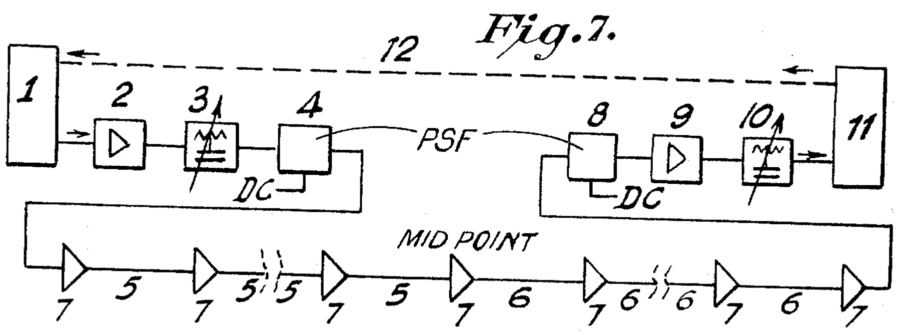
FIGURE 7 is a block diagram for explaining the application of the invention to a unidirectional cable.

FIGURE 7 shows in principle the type of unidirectional system to which the invention can be applied. Only a few major elements are shown, mostly those mentioned in the accompanying discussion. A more complete diagram may be found in FIGURE 2 of P.O.E.E.J., 49, 333.

Carrier terminal equipment, which assemblies the telephone channels in a broad band of frequencies, is indicated at 1. This is connected to an output amplifier 2 and to a so-called temperature equalizer or cable simulator 3, whose loss is $L_t$ nepers, proportional to the square root of frequency, at a time when there is no variation of overall loss or gain of the transmission path, but which can be varied between limits of $L_t \pm Y$ to cancel out half the variation in the transmission path. This is followed by a power separation filter 4, by which a D.C. power supply is connected to the submarine cable assembly. The cable assembly comprises of a number of repeater sections 5 and 6, which according to prior art, would each have a loss of L nepers when no variations are present, and a number of repeaters 7, each having a gain G, assumed for simplicity to be invariable, equal to L. The number of repeaters, N, is assumed to be fairly large compared with unity. At the receiving end there is another power separation filter 8, a receiving amplifier 9, another so-called temperature equalizer or cable simulator, 10, whose characteristics are the same as those of 3, and finally a carrier terminal 11 which translates the broad band back into individual telephone channels. Transmission in the opposite direction is provided by a similar system indicated generally at 12, operating between the same carrier terminals 11 and 1.

The only way in which the system according to the invention differs from prior art is that the loss of each of the repeater sections, 5, in the first half of the cable (in the direction of transmission) is reduced slightly to a value $L-\Delta L$, whereas each of the repeater sections, 6, in the other half of the cable has a loss $L+\Delta L$ (where $\Delta L=2Y/N$ nepers), when no variations are present.

The following table summarizes the level conditions along the cable, assuming that the level at the input to the transmitting temperature equalizer 3 is kept constant at $+L_t$ nepers so that, when no variation is present, the level at the cable input will be zero, as indicated by the asterisk. The settings of units 3 and 10 will be assumed alike, except that in 10 the variation $\pm\Delta L$ of the last section $(N+1)th.$, is also compensated.

It is also assumed that the receiving amplifier, 9, has a gain exactly equal to the loss of $(N+1)th.$ section, namely $L+\Delta L$ when no variation is present. With these assumptions, the level at the output of unit 10 and the input to the receiving carrier terminal 11 will remain constant at $-L_t$ nepers. The level at any point is, of course, calculated by forming the cumulative sum of the gains minus the losses, starting at $+L_t$ at the input to unit 3.

All the losses and levels given in the table below are proportional to the square root of frequency.

| Variation in overall loss of path, (nepers) | Setting of units 3 and 10 (nepers) | Loss of repeater sections 5, (nepers) | Loss of repeater sections 6, (nepers) | Level (nepers) at— | | |
|---|---|---|---|---|---|---|
| | | | | Cable input | Repeater output | |
| | | | | | No. ½N | No. N |
| 0 | $L_t$ | $L-\Delta L$ | $L+\Delta L$ | 0 * | +Y | 0 |
| +2Y | $L_t-Y$ | L | $L+2\Delta L$ | +Y | +Y | −Y |
| −2Y | $L_t+Y$ | $L-2\Delta L$ | L | −Y | +Y | +Y |

From this it is seen that the output level of the ½N*th.* repeater, at or near the middle of the path, is higher than, or at least as high as, that of any other repeater in the path, at all times. It is also seen that, when variations are present, no repeater has an output level exceeding that which would have been present in any case if the invention had not been applied, so that the overload margin is unaffected.

Figure 8:
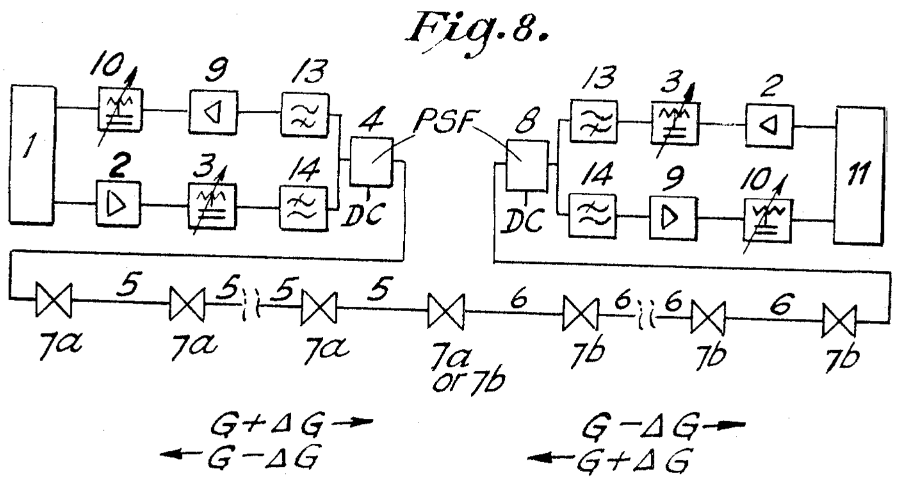
FIGURE 8 is a block diagram illustrating an application of the invention to a bidirectional cable.

FIGURE 8 illustrates an exemplary application of the invention to a bidirectional system. Except where otherwise stated, the reference numerals have the same meaning as in FIGURE 7. Blocks 13 and 14 are directional filters. Whereas in FIGURE 7 there was no structural difference involved in the application of the invention to a system according to prior art, in this case there may be a structural difference, but it would in any case be confined to the repeaters. This will be discussed later. However, the important difference between a bidirectional system according to the invention and one according to prior art, is that the repeaters 7 provide, in each of the two frequency bands used for bidirectional transmission, a gain of $G+\Delta G$ from the input of the cable (for that band) to the mid-point of the path, and a gain of $G-\Delta G$ from the mid-point to the output of the cable (for that band). As will be seen from an inspection of FIGURE 8, there are thus two different types of repeaters, designated 7*a* and 7*b*, which may or may not be structurally different, but which do have different component values and different characteristics. The repeater section loss, when no variation is present, is L throughout, where $L=G$ and $\Delta G=2Y/N$. Here, also, all gains, losses and levels vary as the square root of frequency.

It can readily be seen that this arrangement will give a similar distribution of levels to that set out in the table above, in both directions of transmission.

In order to make the above reasoning clearer, FIGURES 1–4 show the effects of systematic misalignment in the form of plots of the levels of successive repeaters as a function of their position $x$ along the length of a cable, whose total length is X. Strictly speaking the plots should be discontinuous, and represented by points for each individual repeater, but where there is a large number of repeaters, it is permissible to represent them by straight lines passing through the points.

In the preceding discussion, zero level has been arbitrarily defined as the level at the input of the cable when no variations are present and, to be consistent, the other levels were those of repeater outputs. This was also convenient when discussing overloading. Input levels at the repeaters are more suitable as a basis for calculating noise; they differ from their respective output levels by G nepers. Hence by altering the arbitrary zero level by G nepers, the same table will give the input levels of the ½N*th.* and N*th.* repeaters, and zero level may be taken without serious error as the input level of the first repeater, when no variations are present. This basis will be used for FIGURES 1–4.

Figure 1:
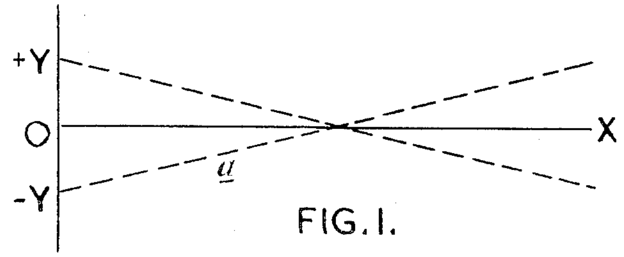

FIGURE 1 shows the effect of systematic misalignment on cable systems according to prior art, in which the repeater section attenuation, in the absence of variations, is L nepers, and in which there is no systematic difference between repeater sections in the two halves of the cable system. Thus if the variation in repeater section loss is an increase $\Delta L=2Y/N$ nepers, the level will fall linearly from +Y nepers at the first repeater, to zero at the mid-point of the route and to −Y nepers at the end repeater. Similarly for a variation of $-2Y/N$ per repeater section, the level would rise linearly from −Y to +Y. This is in accordance with the two rules of symmetry already explained.

The increase of resistance noise in such a system will now be calculated by comparison with an ideal system having zero level at the input to each repeater.

It is immaterial whether a rising or falling level along the direction of transmission is considered, because for every repeater section having a given level in the first case, it is possible to find a corresponding section of the same level in the second case, so that the summation of the noise will be the same. Consider, therefore, a rising level.

Let the noise power per repeater be P microwatts at a point of zero level. Let there be N repeaters. Consider the $m$th, repeater. The level at this repeater will be:

$$+Y[(2m/N)-1]$$

and the noise power introduced into the system will therefore be:

$$Pe^{2Y}\cdot e^{-(4m/N)Y}$$

Summing the noise introduced by all the repeaters, as a geometric progression, the total noise $P_t$ is $$P_t=Pe^{2Y}(1-e^{-4Y})/(1-e^{-4Y/N})$$

Expanding $e^{-4Y/N}$, when $4Y/N$ is small the following is obtained, $$P_t=\frac{P(e^{2Y}-e^{-2Y})}{4Y/N}$$
$$=PN(\sinh 2Y)/2Y$$

The corresponding sum for an ideal system is of course $$P_t=PN$$

Figure 2:
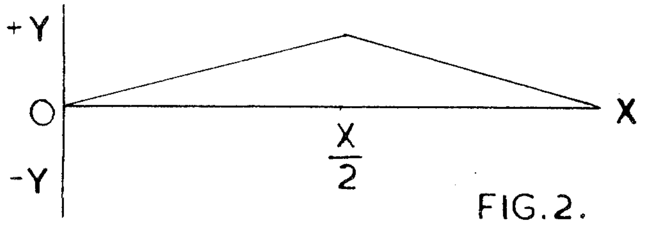

FIGURE 2 illustrates the effect of modifying a cable system according to the invention, by the introduction of deliberate misalignment. In this illustration, it is assumed that no variations are present. As indicated by the table above, the level rises linearly from zero level to +Y nepers at the mid-point and then falls linearly to zero level.

Figure 3:
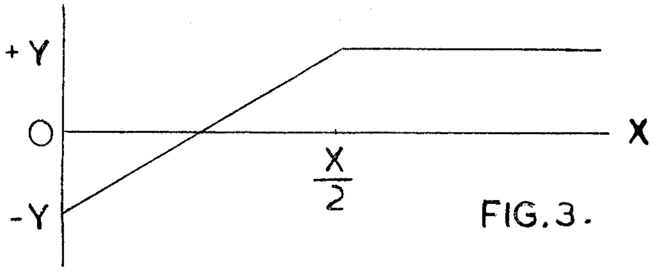
Figure 4:
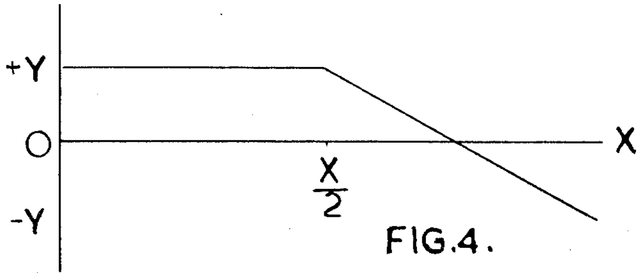

FIGURES 3 and 4 illustrate the effects of variations in the transmission path on a cable system in accordance with the present invention, effects of each sense being shown. The level is constant in each case at +Y nepers for half the path and falls linearly from +Y nepers to −Y nepers in the other half, as indicated by the table above.

The sloping portion of FIGURE 3 is subject to the same misalignment as is represented by the line $a$ in FIGURE 1, in the sense that it extends from +Y to −Y, but since only half the number of repeaters is involved, the noise generated by this portion of the path is $$\tfrac{1}{2}PN(\sinh 2Y)/2Y$$

The noise for the other flat portion of the path is $$\tfrac{1}{2}PNe^{-2Y}$$

so that the total noise for the path is $$P_t=\tfrac{1}{2}PN[e^{-2Y}+(\sinh 2Y)/2Y]$$

Comparing this result with that of the system according to prior art, $$\frac{\text{Noise power for system as Fig. 3 or 4}}{\text{Noise power for system as Fig. 1}}=\tfrac{1}{2}\left[1\ \frac{2Ye^{-2Y}}{\sinh 2Y}\right]$$

It will be shown that there is an improvement which can vary between ½Y nepers, when Y is small, and 0.347 nepers (3 db), when Y is large. Using the well known expansions $$(\sinh x)/x=1+x^2/3!+x^4/5!+\ \ldots\ \text{(no first order term)}$$

and $$e^{-x}=1-x+x^2/2!-\ \ldots\ \text{(with first order term)}$$

it is seen that for small values of Y, the power ratio becomes $$\tfrac{1}{2}(1+1-2Y)=1-Y$$

which, using the second expansion, becomes $$e^{-Y}$$

a power ratio of ½Y nepers.

For large values of Y the last term becomes $4Y/e^{4Y}$, which tends to 0, so that the power ratio becomes ½, corresponding to 3 db or 0.347 neper.

Although this improvement is not very large, it is of particular value since it is both expensive and complicated to obtain a similar improvement by any other means, for example by doubling the power handling capacity or by lowering the repeater gain and using more repeaters. The improvement disclosed in the present invention is obtained by relatively inexpensive means.

The same result is obtained for the conditions illustrated in FIGURE 4, since the same levels occur but in a different order.

In applying the invention to a bidirectional system, the difficulty arises that it is not possible to improve both transmission bands by adjusting the length of repeater sections as described above. However, the noise is usually more serious in the upper band and there may be sufficient margin in the lower band to tolerate a misalignment in the wrong direction.

However, if it is desired to improve the noise in both bands in accordance with the invention, the filters or equalizers may be so designed that they introduce the required gain change in each band, so that there is no need to adjust repeater section lengths. It is, however, preferred to introduce an artificial cable or "cable simulator" having a very small loss, $4Y/N$ nepers, into one or other of the unidirectional transmission paths of the repeater; in addition, the gain of the repeater is raised when no artificial cable is present, by $2Y/N$ nepers, or alternatively the repeater sections are all shortened by a corresponding mount.

Figure 5:
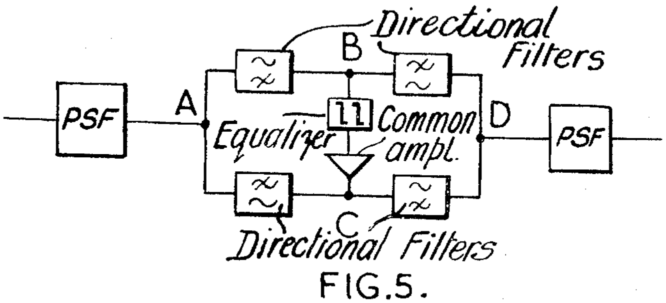

FIGURE 5 shows the circuit of a bidirectional repeater according to prior art. The two unidirectional paths, mentioned above, are superimposed on the same physical cable circuit, and within the repeaters, are also applied to a common equalizer and common amplifier in the path BC, and to common power separation filters (PSF) but are physically separated as well as being separated in frequency in the filter circuits A–B, C–D, D–B and C–A; the respective paths may be traced through ABCD for the high frequency group and DBCA for the low-frequency group. The artificial cable must, therefore, be inserted between A and B or between C and D, to reduce the gain in the high-frequency group, and between D and B or between C and A to reduce the gain in the low-frequency group.

Figure 6:
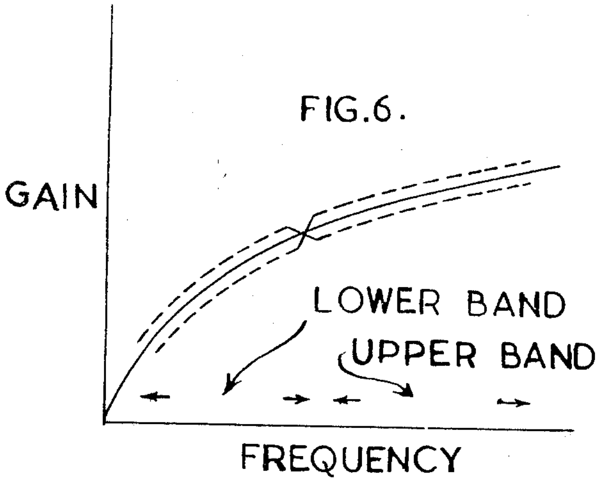
FIGURE 6 is a graph illustrating the repeater gain characteristics in accordance with the present invention.

By inserting the artificial cable in one or other of these transmission paths, where they are physically separated, gain-frequency characteristics of the type shown dotted in FIGURE 6 are obtained. The full line represents the repeater section loss when no variations are present. The differences are, of course, greatly exaggerated in FIGURE 6. The amounts by which the gain exceeds the repeater section loss or the loss exceeds the gain are not likely to be greater than 1 db, even at the highest frequency.

Figure 9:
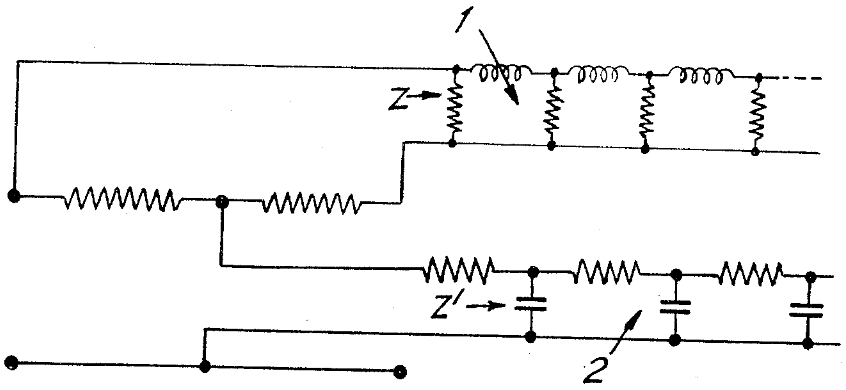
FIGURE 9 shows the schematic of an artificial cable having an attenuation proportional to the square root of frequency.

FIGURE 9 shows the circuit of an artificial cable or "cable simulator" such as is suitable for the above purpose. This network is not novel per se. The form shown is a bridged T network, in which the series arm contains a ladder network, 1. This latter network comprises inductances and resistances which simulate the skin effect of the cable conductor. The shunt arm 2 is the inverse network of the series arm, as well-known in the art. When the loss of the artificial cable is very small, considerable simplification is possible. A simple series or shunt network may replace the bridged T network shown in FIGURE 9, in which case the series network must have an impedance 2Z, or the shunt network must have an impedance ½Z′, where Z and Z′ are the impedances of the networks 1 and 2 respectively in FIGURE 9, as is well-known in the art. Whether a bridged T network, a series network or a shunt network is used, the number of elements will depend on the loss to be inserted and the accuracy with which the loss-frequency characteristic is to be achieved. Thus, for example, a shunt network with only two or three elements may be suitable. Of course, the bridged T network may be designed to provide a constant impedance but, on the other hand, the impedance irregularity introduced by a series or shunt network may be tolerable.

If a series or shunt network is used, it may form part of the directional filter assembly. The filters may thus contain dissipative elements.

It is also possible to achieve the same result by designing the equalizer in the path BC of FIGURE 5 to provide an overall gain-frequency characteristic similar to one or other of the dotted curves in FIGURE 6. As in the analogous case of U.S. specification 2,342,544, it would be difficult to define the structural difference which would result from the application of the invention. The equalizer designer would merely be given a modified gain-frequency characteristic in his target specification. The problem of equalizer design would, however, be greatly simplified if an elementary artificial cable consisting of a single series or shunt resistor were associated with the filter circuits. This would provide the "step" in the gain frequency characteristic, a feature which would be more expensive to provide by equalizer design alone. It will thus be appreciated that there are many possible procedures which will give the result shown in FIGURE 6, many of which are known per se and are not claimed as novel.

What is claimed is:

1. A repeatered cable system comprising a line transmission path having, in the direction of transmission, a first and a second half, the path having a certain median value of overall gain or loss, the maximum expected systematic time variation about the said median value being ±2Y nepers, the said variation as well as the repeater gains and the repeater section losses being substantially proportional to the square root of the frequency of operation; two terminal stations connected to respective ends of the said path; and a plurality of repeaters, and of repeater section interposed therebetween, disposed along each half of the path, there being a total of N repeaters in the two halves of the path, each repeater having a certain median gain and each repeater section having a certain median loss, the median values of the gains of the repeaters of the first half of the path being systematically set and the lengths of the interposed repeater sections being systematically dimensioned so that the average of the median gains of the repeaters of the said first half exceeds by $2Y/N$ nepers the average of the median losses of the repeater sections in that half, the respective said parameters of the repeaters and of the repeater sections of the second half of the path being so systematically dimensioned that the average of the median gains of the repeaters of the said second half is less by $2N/Y$ nepers than the average of the median losses of that half; the relative input levels of repeaters in the middle region of the line path being maintained in use substantially constant, despite the aforesaid variations, by adjustments made at the terminal stations.

2. A system as claimed in claim 1 wherein the said average gain of the said first half is substantially equal to the said average gain of the said second half; and wherein the average length of the interposed repeater sections of the first half is sufficiently short that, in that half, the average of the said gains exceeds the average of the said losses by $2Y/N$ nepers, the average length of the interposed repeater sections of the second half being sufficiently long that, in that half, the average of the said losses exceeds the average of the said gains by $2Y/N$ nepers.

3. A repeatered cable system arranged for bidirectional transmission, the system including two oppositely-directed transmission paths occupying different frequency bands, a common physical circuit providing both paths in the cable and in some certain parts of the repeaters, although the paths are separated physically as well as in frequency in the other parts of the repeaters, each said transmission path having, in the direction of transmission, a first and second half, each path having a certain median value of overall gain or loss, the maximum expected systematic time variation about the said median value being ±2Y nepers, the said variation as well as the repeater gains and repeater section losses being proportional to the square root of frequency; two terminal stations connected to respective ends of the said path; and a plurality of repeaters, and of repeater sections interposed therebetween, disposed along each half of the path, there being a total of N repeaters in the path, each repeater having a certain median gain, for each frequency band transmitted and for each direction, and each repeater section having a certain median loss for each frequency band transmitted, the said median values of the gains of the repeaters of the corresponding first half of the path being systematically set and the lengths of the interposed repeater sections being systematically dimensioned so that the average of the said median gains of the repeaters of the said first half exceeds by $2Y/N$ nepers the average of the median losses of the repeater sections in that half, the respective said parameters of the repeaters and of the repeaters sections of the corresponding second half of the path being so systematically dimensioned that the average of the said median gains of the repeaters of the said second half is less by $2Y/N$ nepers than the average of the said median losses of that half; the relative input levels of repeaters in the middle region of the line path being maintained in use substantially constant, despite the aforesaid variations, by adjustments made at the terminal stations.

4. A repeatered cable system as claimed in claim 3, in which the differing repeater gain-frequency response characteristics of the halves of the cable are obtained by inserting an artificial cable whose loss is $4Y/N$ nepers, in a predetermined one of the two physically separated transmission paths of each repeater according to its position in the system, and making the corresponding average repeater gain $2Y/N$ nepers higher than the average repeater-section loss, in the absence of the said artificial cable.

5. A repeatered cable system as claimed in claim 3, in which each repeater includes an equalizer and the differing repeater gain-frequency response characteristics of the halves of the cable are obtained by means of the characteristics of the said equalizers.

6. A repeatered cable system as claimed in claim 3, in which each repeater includes at least two filters and the differing repeater gain-frequency response characteristics of the halves of the cable are obtained by providing dissipative elements in the said filters.

7. A repeatered cable system as claimed in claim 3, in which each repeater includes one equalizer and at least two filters and in which the differing repeater gain-frequency response characteristics of the halves of the cable are obtained partly by means of the characteristics of the said equalizer and partly by providing dissipative elements in the said filters.

8. A repeatered cable system comprising a line transmission path having, in the direction of transmission, a first and a second half, the path having a certain median value of overall gain or loss the maximum expected systematic time variation about the said median value being ±2Y nepers and being substantially proportional to the square root of the frequency of operation; two terminal stations connected to respective ends of the said path; and a plurality of repeaters, and of repeater sections interposed therebetween, disposed along each half of the path, there being a total of N repeaters in the two halves of the path, each repeater having a certain median gain and each repeater section having a certain median loss; means being provided for causing the average of the values of the gains of the first half of the path to exceed by $2Y/N$ nepers the average of the values of the losses of the repeater sections of that half, and means being provided for causing the average of the values of the losses of the repeater sections of the second half of the path to exceed by $2Y/N$ nepers the average of the repeater gains of that half, the said difference of $2Y/N$ nepers being those which exist at a time when the overall loss or gain has the said median value; the relative input levels of repeaters in the middle region of the line path being maintained in use substantially constant, despite the aforesaid variations, by adjustments made at the terminal stations.

No references cited.

KATHLEEN H. CLAFFY, *Primary Examiner.*

H. ZELLER, *Assistant Examiner.*